United States Patent [19]

Couffet et al.

[11] Patent Number: 5,397,877
[45] Date of Patent: Mar. 14, 1995

[54] DEVICE FOR THE HOMOGENEOUS INDUCTIVE HEATING OF METALLIC FLAT PRODUCTS ON THE MOVE

[75] Inventors: Claude Couffet, Montreuil; Jean Hellegouarc'h, Le Perreux/Marne; Gérard Prost, Fresnes; Jean C. Uring, Colmar, all of France

[73] Assignee: Celes, Lautenbach, France

[21] Appl. No.: 80,831

[22] Filed: Jun. 24, 1993

[30] Foreign Application Priority Data

Jun. 24, 1992 [FR] France .................. 92 07741

[51] Int. Cl.⁶ ............................................. H05B 6/40
[52] U.S. Cl. .................................. 219/645; 219/646; 219/671
[58] Field of Search ............ 219/10.61 R, 10.69, 219/10.71, 10.75, 10.67, 10.79, 645, 646, 653, 656, 670, 671, 676

[56] References Cited

U.S. PATENT DOCUMENTS

| | | | |
|---|---|---|---|
| 2,448,009 | 8/1948 | Baker | 219/10.61 R |
| 2,902,572 | 9/1959 | Lackner et al. | 219/10.61 R |
| 3,041,434 | 6/1962 | Alf | 219/645 |
| 4,122,321 | 10/1978 | Cachat | 219/646 |
| 4,321,444 | 3/1982 | Davies | 219/10.71 |
| 4,484,048 | 11/1984 | Travers et al. | 219/10.61 R |
| 4,678,883 | 7/1987 | Saitoh et al. | 219/10.61 R |
| 4,795,872 | 1/1989 | Hagisawa et al. | 219/10.61 R |
| 4,891,484 | 1/1990 | Waggott et al. | 219/10.61 R |
| 5,034,586 | 7/1991 | Havas et al. | 219/10.71 |

FOREIGN PATENT DOCUMENTS

| | | |
|---|---|---|
| 1034097 | 7/1953 | France . |
| 1235881 | 5/1960 | France . |
| 2495752 | 6/1982 | France . |
| 903 847 | 2/1954 | Germany . |

*Primary Examiner*—Philip H. Leung
*Attorney, Agent, or Firm*—Pollock, Vande Sande & Priddy

[57] ABSTRACT

Device for the induction heating of flat metallic products on the move with the aid of electrical coils provided on magnetic armatures arranged on either side of the large faces of the product to be heated, which moves continuously between the said coils, wherein the inductors are mechanically independent of each other and they are arranged symmetrically in relation to the median plane of the product so that the magnetic fields generated are in phase opposition, leading to a ring-like distribution of the currents induced in the product to be heated up.

3 Claims, 2 Drawing Sheets

DEVICE FOR THE HOMOGENEOUS INDUCTIVE HEATING OF METALLIC FLAT PRODUCTS ON THE MOVE

FIELD OF THE INVENTION

The present invention relates to a device for the inductive heating, on the move, of flat products, especially metallic flat products.

BACKGROUND OF THE INVENTION

At the present time, the inductive heating of flat products on the move is achieved with the aid of coils which are arranged so as to surround the product to be heated up by creating a magnetic field parallel to the external surface of this product in the direction of movement (longitudinal flux). In these induction heating installations, the internal dimensions of each coil depend on the shape of the product and on its possible geometrical defects. In the design of the coils, it has therefore been necessary to take into account these requirements and this results in an internal over-dimensioning of the coil in relation to the volume to be heated, which leads to a low effectiveness of the heating, a reduction in the electrical efficiency and, consequently, to an increase in the size of the induction heating installations. Moreover, in these known installations, the product is a "prisoner" of the coil given that it moves along inside the fixed coils.

On the other hand, in these installations, a ring-like distribution of the induced currents which encircle the continuously moving product is obtained, which leads to heating whose distributional homogeneity is generally considered as satisfactory.

According to another known solution for the inductive heating of flat metallic products on the move, a magnetic field perpendicular to the large faces of the product to be heated is created according to the technique called "in-phase transverse flux". In this method of implementation, two coils are arranged on either side of the product to be heated up, opposite each of the latter's faces, these coils being supplied at a frequency such that the magnetic field is traversing. In the installations implementing this known technique, the distance between the coils (which are mechanically separate from each other) and the product to be heated up may be reduced to a strict minimum, which makes it possible to obtain increased effectiveness of the induction heating and an improvement in the electrical efficiency. Furthermore, in these installations, the product to be heated up is not a prisoner of the inductor, which makes it possible to intervene without difficulty in the event of hitches in the running of the heating-on-the-move process.

However, in these known installations, the loop-like distribution of the induced currents does not generally enable a satisfactory heating homogeneity to be obtained.

Given the drawbacks of the solutions according to the prior art mentioned hereinabove, the present invention is proposed in order to provide an original solution by producing an induction heating device leading to a ring-like distribution of the currents induced in the product to be heated, which thus ensures that this product is heated with a satisfactory distributional homogeneity and with the possibility of adjusting the position of the coils of the inductor, in relation to the product, which improves the effectiveness of the heating as well as the safety.

BRIEF DESCRIPTION OF THE INVENTION

Consequently, the present invention relates to a device for the induction heating of flat metallic products on the move with the aid of electrical coils provided on magnetic armatures arranged on either side of the large faces of the product to be heated, which moves continuously between the said coils, characterised in that the inductors are mechanically independent of each other and they are arranged symmetrically in relation to the median plane of the product and are supplied electrically so that the magnetic fields generated are in phase opposition, leading to a ring-like distribution of the currents induced in the product to be heated up.

According to one characteristic of the device of the invention, each of the coils is supplied with single-phase alternating current, the frequency of which is determined so that the depth of penetration of the induced currents is less than the half-thickness of the heated product.

Other characteristics and advantages of the present invention will emerge from the description given hereinbelow with reference to the attached drawings which illustrate an embodiment thereof without any limiting character. In the drawings:

DETAILED DESCRIPTION OF THE INVENTION

Figure 1:
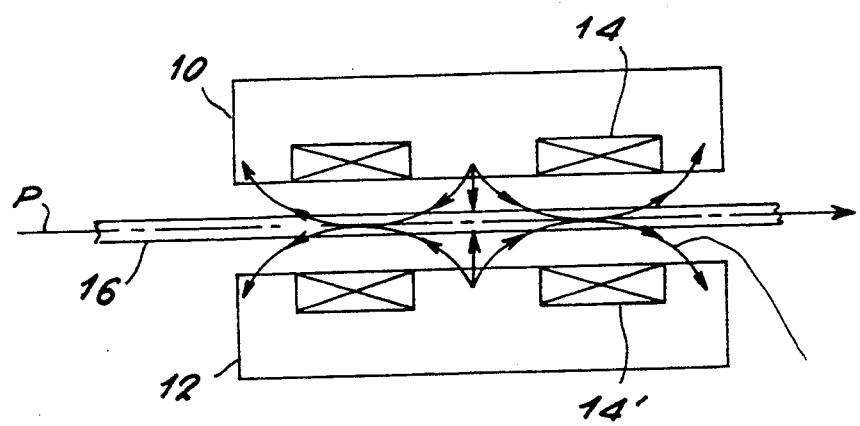
FIG. 1 is a vertical axial sectional diagrammatic view of an induction heating device produced in accordance with the invention.
Figure 2:
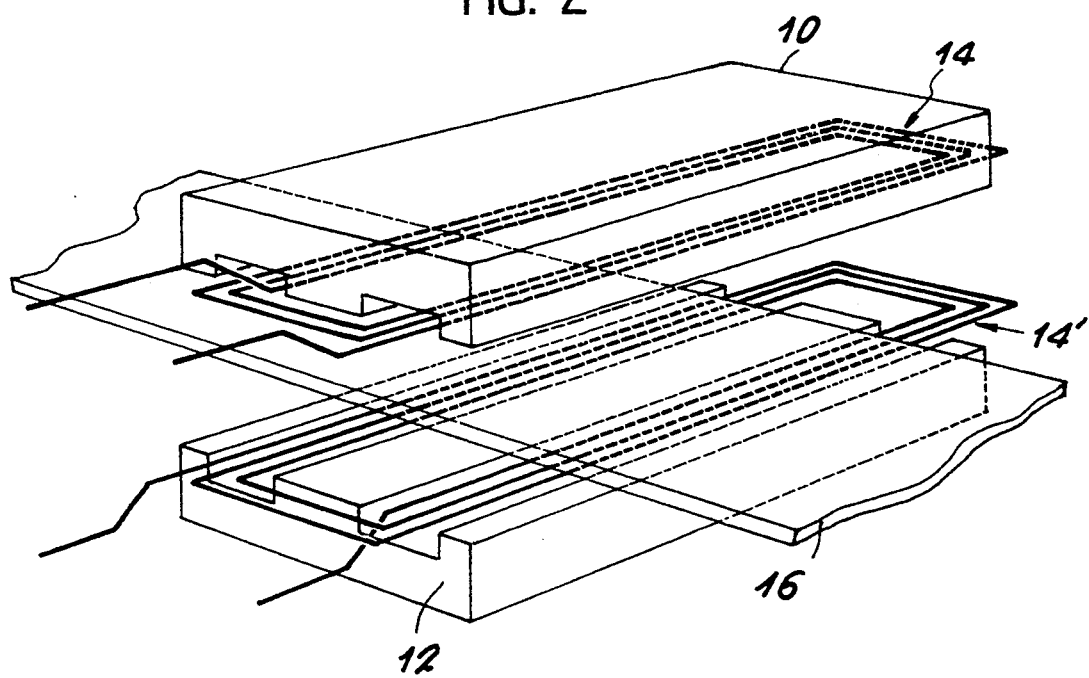
FIG. 2 is a perspective view of this same device.

Referring to the drawings, and more particularly to FIGS. 1 and 2, it may be seen that the induction heating device according to the present invention comprises, in this non-limiting embodiment, two magnetic armatures, respectively 10 and 12, provided with electrical coils such as 14, 14', these armatures being placed on either side of the large faces of the product 16 to be heated.

According to the invention, each of the armatures 10, 12 is supplied with the aid of a single-phase alternating current, the frequency of which is chosen so that the penetration depth of the currents induced in the product 16 to be heated is less than the half-thickness of this product. As FIG. 1 shows, this characteristic makes it possible to obtain a neutral zone in which the magnetic field is non-existent, this neutral zone extending on either side of the central median plane P, parallel to the large faces of the product 16 and which ultimately coincides with this plane in which no induced current exists, right up to the vicinity of the edges of the product 16.

According to the present invention, a ring-like distribution of the induced currents is produced so as to obtain heating of satisfactory distributional homogeneity. This ring-like closing of the currents induced in the large faces by the small faces of the product 16 to be heated up is obtained by eliminating the component of the magnetic field which is tangential to the small face and orthogonal to the median plane P defined hereinabove. According to the invention, this result is attained by supplying the armatures 10-12, arranged symmetrically in relation to the median plane P, so that the magnetic fields generated are in phase opposition.

It will be noted that, by virtue of the characteristics of the present invention which are described hereinabove, the distribution of the induced currents, and therefore the heating homogeneity, are not influenced by the width of the product 16 since the active surface of the inductor extends over a width greater than that of the largest product which is to be heated by the device according to the invention.

In the induction heating device according to the invention, such as described hereinabove, the two armatures 10 and 12 are mechanically independent of each other. As a result, it is possible to adjust, to any required value, their respective distance in relation to the product 16 to be heated up, this device furthermore constituting an "open" inductor which may be withdrawn even in the presence of the product to be heated, which leads to a considerable improvement as regards effectiveness and safety.

Figure 3:
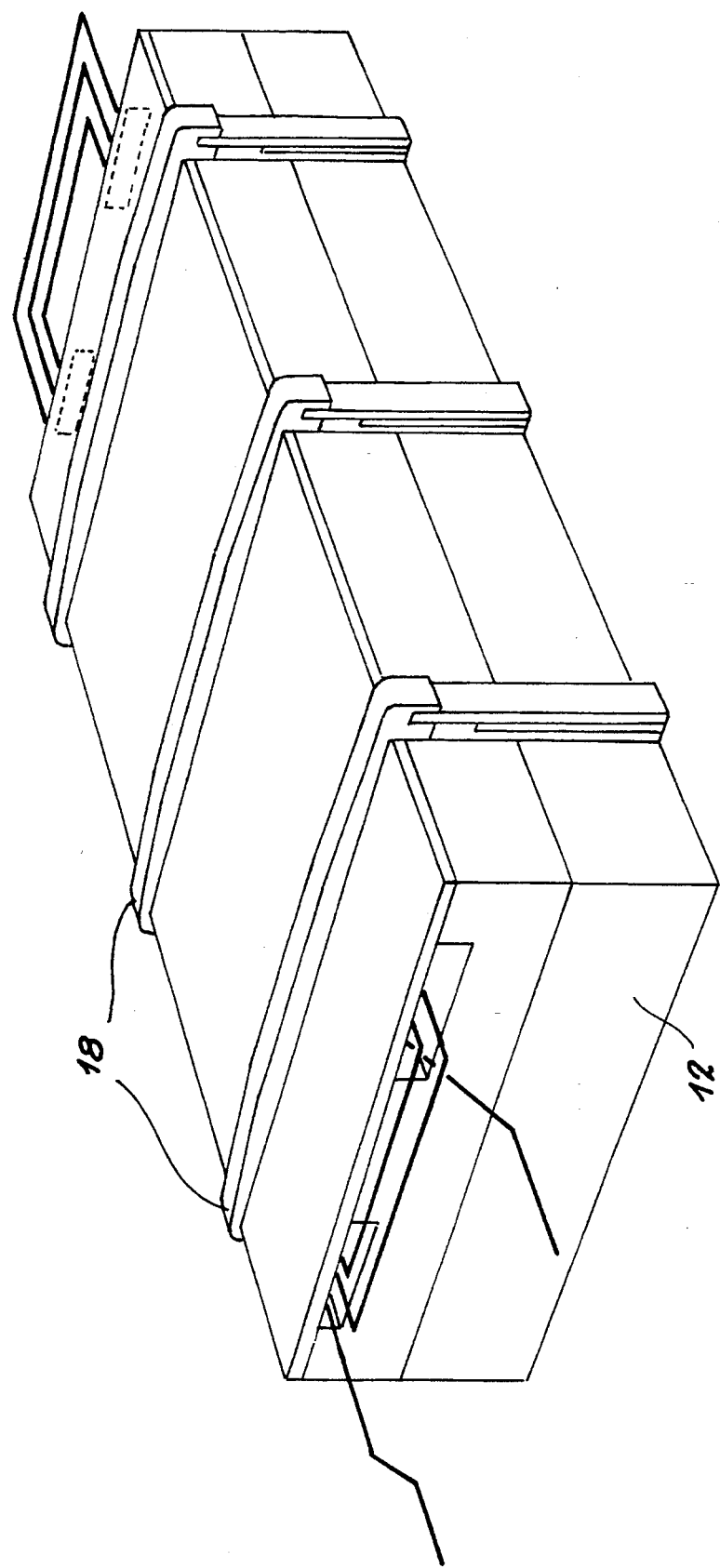
FIG. 3 represents an armature of a heating inductor according to a variant of the present invention.

According to the present invention, each of the armatures, such as 10–12, may be fitted, on its external face (see FIG. 3) with a ski system, such as 18, integrated into the structure of the inductor, making it possible to protect this inductor and, more particularly the heat shields, from possible impacts coming from surface irregularities or defects in the products 16 to be heated. The number of skis is chosen as a function of the length of the inductor.

In addition to the advantages already mentioned hereinabove, especially good distributional homogeneity of the heating of the product, high electrical efficiency, increased effectiveness of the heating and better safety, which are provided by the induction heating device which forms the subject of the present invention, mention may furthermore be made of the additional advantages hereinbelow;

high specific power, and compactness permitting installation of the heating device between the rollers of a stand-by tables in an installation for treating strip-like metallic products.

It remains understood that the present invention is not limited to the embodiments described and/or represented here, but that it encompasses all the variants thereof.

We claim:

1. An induction heating device for moving metallic flat products, comprising:

a single pair of spaced coil cores positioned opposite the sides of a product, the cores being independently adjustable relative to the product which moves continuously between the cores;

means for guiding the product along an axis transverse to the length of the cores;

the cores including a plurality of laminations positioned parallel to the product; and coil means respectively mounted on the cores for carrying single phase AC current, of opposite phase, and having a preselected frequency for inducing current loops in corresponding confronting surfaces of the product, to depths of less than half the thickness of the product.

2. The heating device set forth in claim 1 wherein the guiding means further comprises:

at least one band encircling each core which also protects the body of the corresponding core from impact by the product.

3. A method for uniformly heating a flat metallic product, comprising the steps:

positioning a single pair of spaced electrical coil assemblies in parallel spaced relation to opposite sides of the product, the coil assemblies being independently adjustable relative to the product;

continuously moving the product between the coil assemblies, along an axis transverse to the length of the coil assemblies;

energizing the coil assemblies with a single phase AC current, to produce magnetic fields of opposite phase, and having a preselected frequency to produce magnetic fields of opposite phase, for inducing current loops in corresponding confronting surfaces of the product, to depths of less than half the thickness of the product.

* * * * *